US012618970B2

(12) United States Patent
Shima et al.

(10) Patent No.: US 12,618,970 B2
(45) Date of Patent: May 5, 2026

(54) OBJECT DETECTION DEVICE, OBJECT DETECTION METHOD, AND RECORDING MEDIUM

(71) Applicant: Panasonic Intellectual Property Management Co., Ltd., Osaka (JP)

(72) Inventors: Takahiro Shima, Osaka (JP); Tadashi Morita, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 225 days.

(21) Appl. No.: 18/508,955

(22) Filed: Nov. 14, 2023

(65) Prior Publication Data

US 2024/0288576 A1 Aug. 29, 2024

(30) Foreign Application Priority Data

Feb. 28, 2023 (JP) ................................. 2023-029179

(51) Int. Cl.
| | |
|---|---|
| *G01S 15/60* | (2006.01) |
| *G01S 15/00* | (2020.01) |
| *G01S 15/931* | (2020.01) |

(52) U.S. Cl.
CPC ............ *G01S 15/60* (2013.01); *G01S 15/003* (2013.01); *G01S 15/931* (2013.01); *G01S 2015/938* (2013.01)

(58) Field of Classification Search
CPC ...... G01S 15/60; G01S 15/003; G01S 15/931; G01S 2015/938
See application file for complete search history.

(56) References Cited

U.S. PATENT DOCUMENTS

| | | | | |
|---|---|---|---|---|
| 4,890,488 | A * | 1/1990 | Pincent | G01P 5/18 |
| | | | | 73/170.13 |
| 5,343,744 | A * | 9/1994 | Ammann | G01P 5/248 |
| | | | | 73/170.13 |
| 5,783,745 | A * | 7/1998 | Bergman | G01W 1/02 |
| | | | | 73/170.13 |
| 5,986,357 | A * | 11/1999 | Myron | G11C 29/38 |
| | | | | 340/541 |
| 6,759,954 | B1 * | 7/2004 | Myron | H05B 47/12 |
| | | | | 340/555 |
| 9,102,333 | B2 * | 8/2015 | Yang | B60W 50/14 |
| 9,880,273 | B2 * | 1/2018 | Matsuura | G01S 15/04 |
| 11,255,663 | B2 * | 2/2022 | Binder | G01S 15/08 |
| 2005/0278098 | A1 * | 12/2005 | Breed | B60K 35/28 |
| | | | | 701/45 |

(Continued)

FOREIGN PATENT DOCUMENTS

JP 6413620 B2 10/2018

*Primary Examiner* — Isam A Alsomiri
*Assistant Examiner* — Amie M Ndure
(74) *Attorney, Agent, or Firm* — Seed Intellectual Property Law Group LLP

(57) ABSTRACT

An object detection device includes an acquisition circuit, a calculation circuit, and an estimation circuit. The acquisition circuit acquires elapsed times from when an ultrasonic wave is transmitted from a transmission microphone to when reception microphones each receive the ultrasonic wave. The calculation circuit calculates a wind speed on the basis of the elapsed times acquired by the acquisition circuit. The estimation circuit estimates a vehicle state on the basis of the wind speed calculated by the calculation circuit.

19 Claims, 11 Drawing Sheets

AIRFLOW

2 TRAVELING DIRECTION

<WHEN DIRECTED UPWARD>

DIRECTION OF AIRFLOW

DIRECT WAVE 1: t1
DIRECT WAVE 1: t2

TIME OF FLIGHT t1<t2

(56) References Cited

U.S. PATENT DOCUMENTS

| | | | |
|---|---|---|---|
| 2008/0040004 A1* | 2/2008 | Breed | G01S 7/023 |
| | | | 701/45 |
| 2008/0045150 A1* | 2/2008 | Forster | G01S 13/878 |
| | | | 455/41.2 |
| 2008/0046150 A1* | 2/2008 | Breed | B60R 21/0134 |
| | | | 701/45 |
| 2014/0371948 A1* | 12/2014 | Yang | B60W 40/02 |
| | | | 701/1 |
| 2016/0238700 A1* | 8/2016 | Matsuura | G01S 15/931 |
| 2017/0294125 A1 | 10/2017 | Matsuura et al. | |
| 2019/0154439 A1* | 5/2019 | Binder | G01S 15/42 |
| 2022/0057519 A1* | 2/2022 | Goldstein | G01S 17/88 |
| 2022/0066456 A1* | 3/2022 | Ebrahimi Afrouzi | |
| | | | G06F 3/04883 |

* cited by examiner

FIG.4
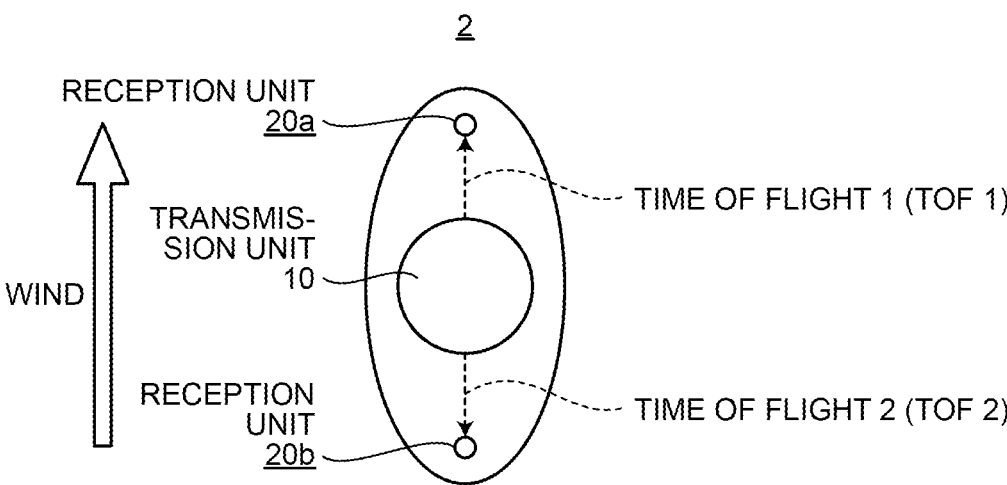
FIG.5A                      FIG.5B
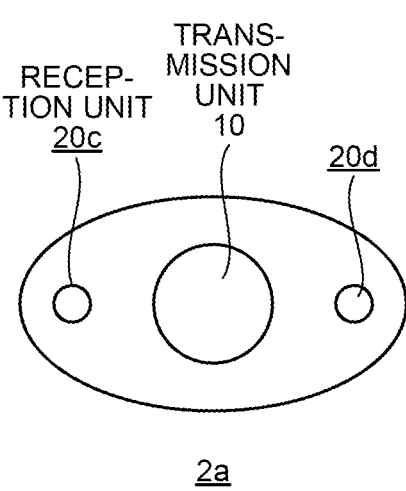              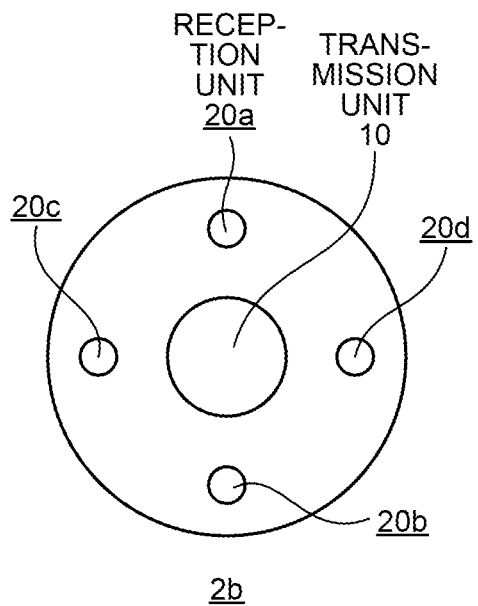

FIG.6A
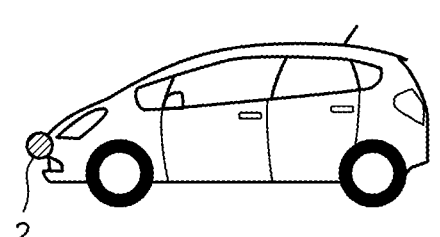
<WHEN THERE IS NO AIRFLOW>
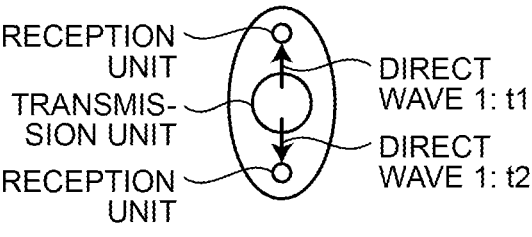
RECEPTION UNIT
TRANSMIS-SION UNIT
RECEPTION UNIT
DIRECT WAVE 1: t1
DIRECT WAVE 1: t2
TIME OF FLIGHT t1=t2
FIG.6B
AIRFLOW
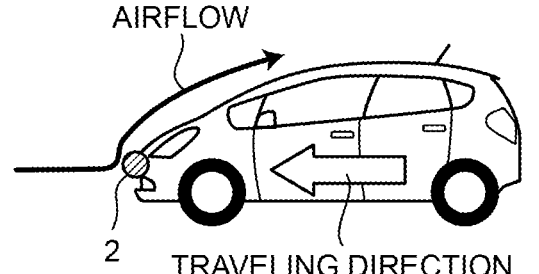
TRAVELING DIRECTION
<WHEN DIRECTED UPWARD>
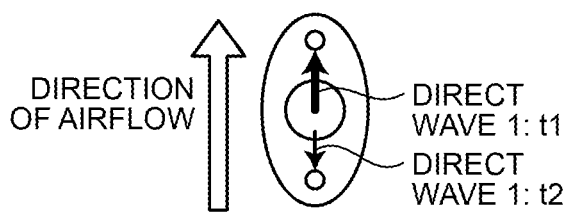
DIRECTION OF AIRFLOW
DIRECT WAVE 1: t1
DIRECT WAVE 1: t2
TIME OF FLIGHT t1<t2

INSTANTANEOUS WIND SPEED (AT INTERVAL OF 50 ms)

AIRFLOW

DIRECTION OF
NATURAL WIND

TRAVELING DIRECTION

2

WIND SPEED AT TIME OF TRAVELING FORWARD (0 → 60 → 0 km/h) AGAINST HEADWIND

VEHICLE SPEED+WIND

VEHICLE SPEED AT TIME OF
TRAVELING FORWARD ONLY

DIRECTION OF AIRFLOW

AIRFLOW

TRAVELING DIRECTION

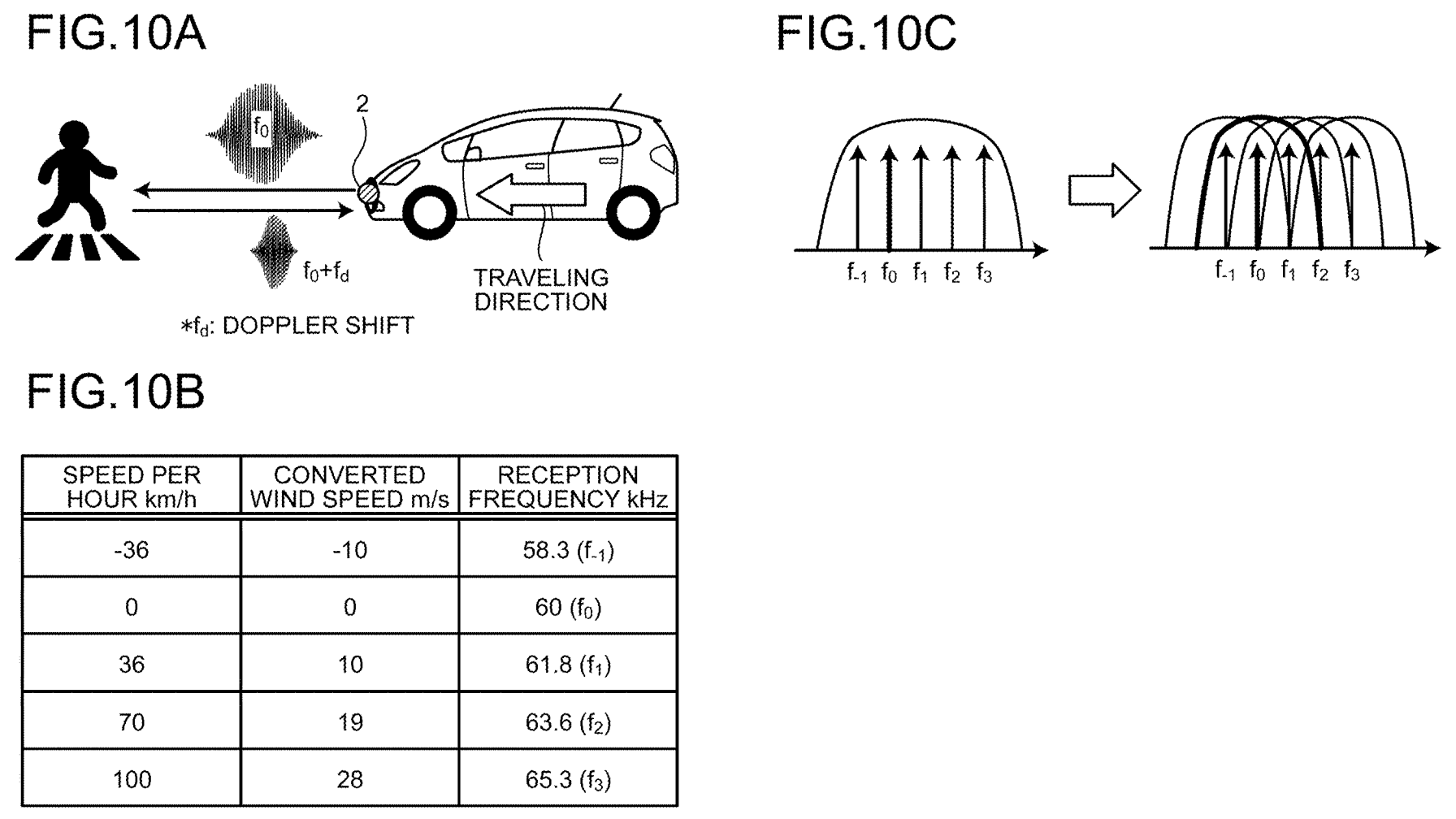

TRAVELING DIRECTION

*$f_d$: DOPPLER SHIFT

FIG.10B

| SPEED PER HOUR km/h | CONVERTED WIND SPEED m/s | RECEPTION FREQUENCY kHz |
|---|---|---|
| -36 | -10 | 58.3 ($f_{-1}$) |
| 0 | 0 | 60 ($f_0$) |
| 36 | 10 | 61.8 ($f_1$) |
| 70 | 19 | 63.6 ($f_2$) |
| 100 | 28 | 65.3 ($f_3$) |

OBJECT DETECTION DEVICE, OBJECT DETECTION METHOD, AND RECORDING MEDIUM

CROSS-REFERENCE TO RELATED APPLICATIONS

This application is based upon and claims the benefit of priority from Japanese Patent Application No. 2023-029179, filed on Feb. 28, 2023, the entire contents of which are incorporated herein by reference.

FIELD

The present disclosure relates generally to an object detection device, an object detection method, and a recording medium.

BACKGROUND

As an existing method of transmission and reception control for ultrasonic sensors, there is technology in which a transmission and reception controller provided in an electronic control unit (ECU) changes transmission and reception timings of an ultrasonic sensor on the basis of vehicle information (traveling forward, traveling backward, the vehicle speed, etc.) (see, for example, JP 2016-085036 A). For example, at the time of traveling forward, an ultrasonic sensor facing in the traveling direction is operated to transmit detection data to the ECU.

In such an existing technology, examination on increasing the number of ultrasonic sensors connected to an ECU is insufficient.

SUMMARY

An object detection device according to the present disclosure includes an acquisition circuit, a calculation circuit, and an estimation circuit. The acquisition circuit is configured to acquire elapsed times from when an ultrasonic wave is transmitted from a transmission microphone to when reception microphones each receive the ultrasonic wave. The calculation circuit is configured to calculate a wind speed on the basis of the elapsed times acquired by the acquisition circuit. The estimation circuit is configured to estimate a vehicle state on the basis of the wind speed calculated by the calculation circuit.

BRIEF DESCRIPTION OF THE DRAWINGS

FIG. 4 is a diagram for describing calculation of a wind speed by the object detection device according to the embodiment;

FIGS. 5A and 5B are diagrams for describing locations of reception units according to the embodiment;

FIGS. 6A and 6B are diagrams for describing estimation of a vehicle state by the object detection device according to the embodiment;

FIGS. 8A to 8D are diagrams for describing changing a transmission pattern by the object detection device according to the embodiment;

FIGS. 10A to 10C are diagrams for describing changing a reception band by the object detection device according to the embodiment;

DETAILED DESCRIPTION

Hereinafter, embodiments of an object detection device 1 according to the present disclosure will be described with reference to the drawings.

In the following, an example in which the object detection device 1 is mounted on a vehicle will be described, whereas it is not limited thereto.

1. Introduction

Figure 1:
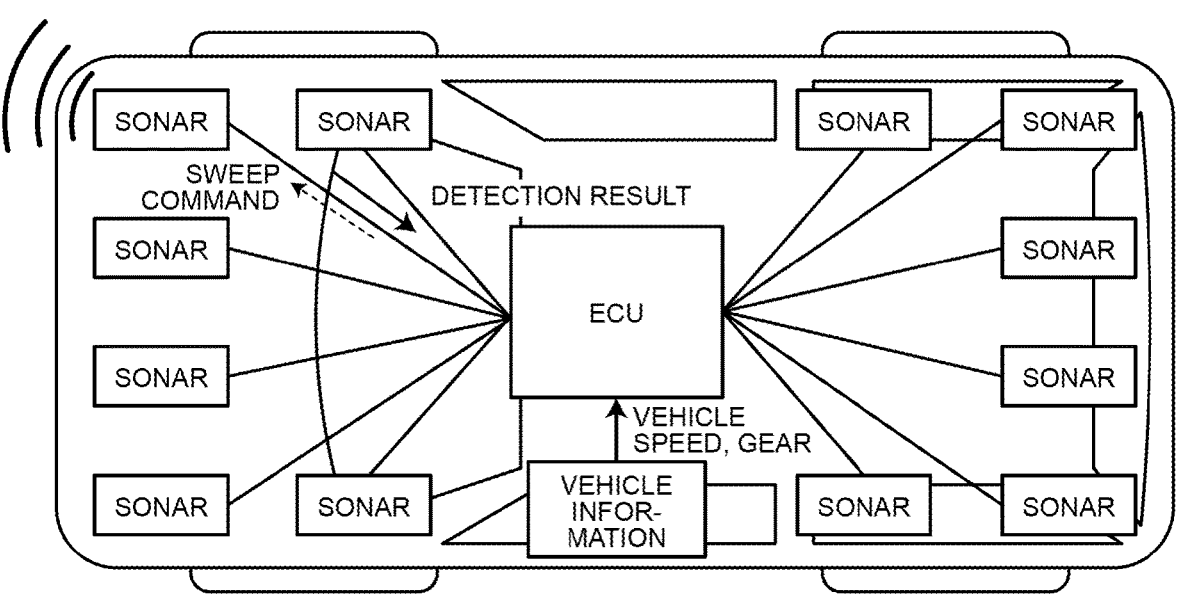
FIG. 1 is a diagram for describing a related art.

As illustrated in FIG. 1 for a related art, a sonar module is mounted on a vehicle or the like to detect an obstacle by using an ultrasonic wave. The sonar module communicates with an ECU and is controlled on the basis of vehicle information representing traveling forward, traveling backward, or the vehicle speed acquired from the ECU.

However, it is difficult for the sonar modules to handle an increase in the number of sensors. For example, in a case where the number of sonar modules mounted on a vehicle increases, the communication band used between an ECU and the sonar modules becomes insufficient, and it becomes difficult to perform stable control.

Moreover, in a case of causing the sonar modules to autonomously operate, communication with the ECU is not performed. Therefore, it is difficult to change the behavior of various sensors on the basis of the vehicle information.

Figure 2:
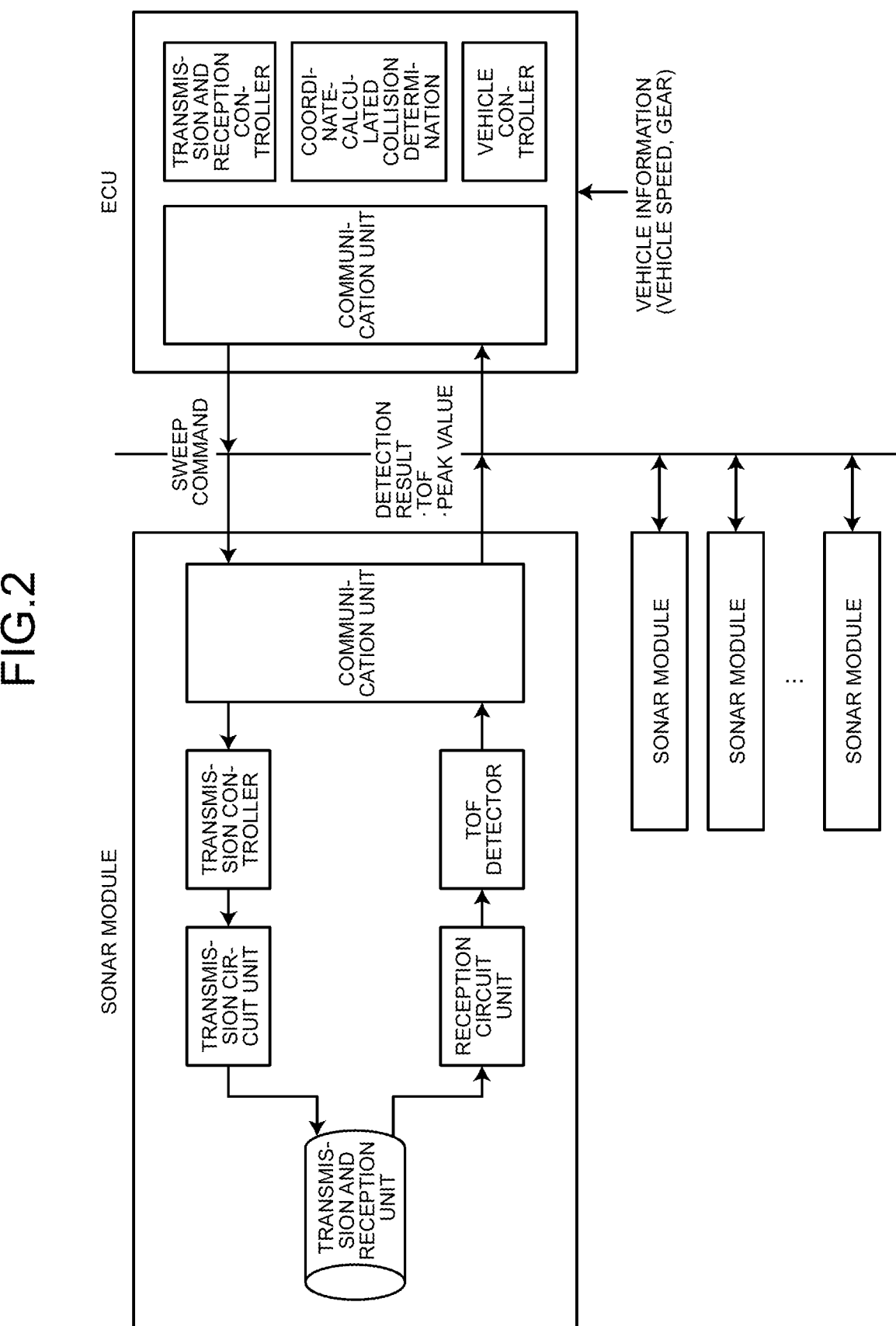
FIG. 2 is a diagram for describing the related art.

In addition, in the existing technology, the transmission and reception controller of the ultrasonic sensor is provided inside the ECU as illustrated in FIG. 2. Therefore, there is a possibility that transmission and reception of the ultrasonic sensor becomes difficult when the ECU is changed to have different specifications. Therefore, in order for the ultrasonic sensor to perform transmission and reception control without depending on the ECU specifications, it is desirable that the ultrasonic sensor itself can perform autonomous operation to perform transmission and reception control.

Considering the above, an embodiment of the present disclosure performs processing that includes: calculating the wind speed as a speed at which the air around a sonar module flows by using a time difference between elapsed times from when an ultrasonic wave is transmitted from a transmission microphone 10 to when reception microphones 20 each receive the ultrasonic wave; and estimating a vehicle state (traveling direction) on the basis of the wind speed. The processing makes the sonar module possible to acquire the vehicle state while operating autonomously. The communication capacity between sensors and an ECU is reduced, thereby making it possible to handle an increase in the number of sensors.

2. Configuration Example of Object Detection Device

Figure 3:
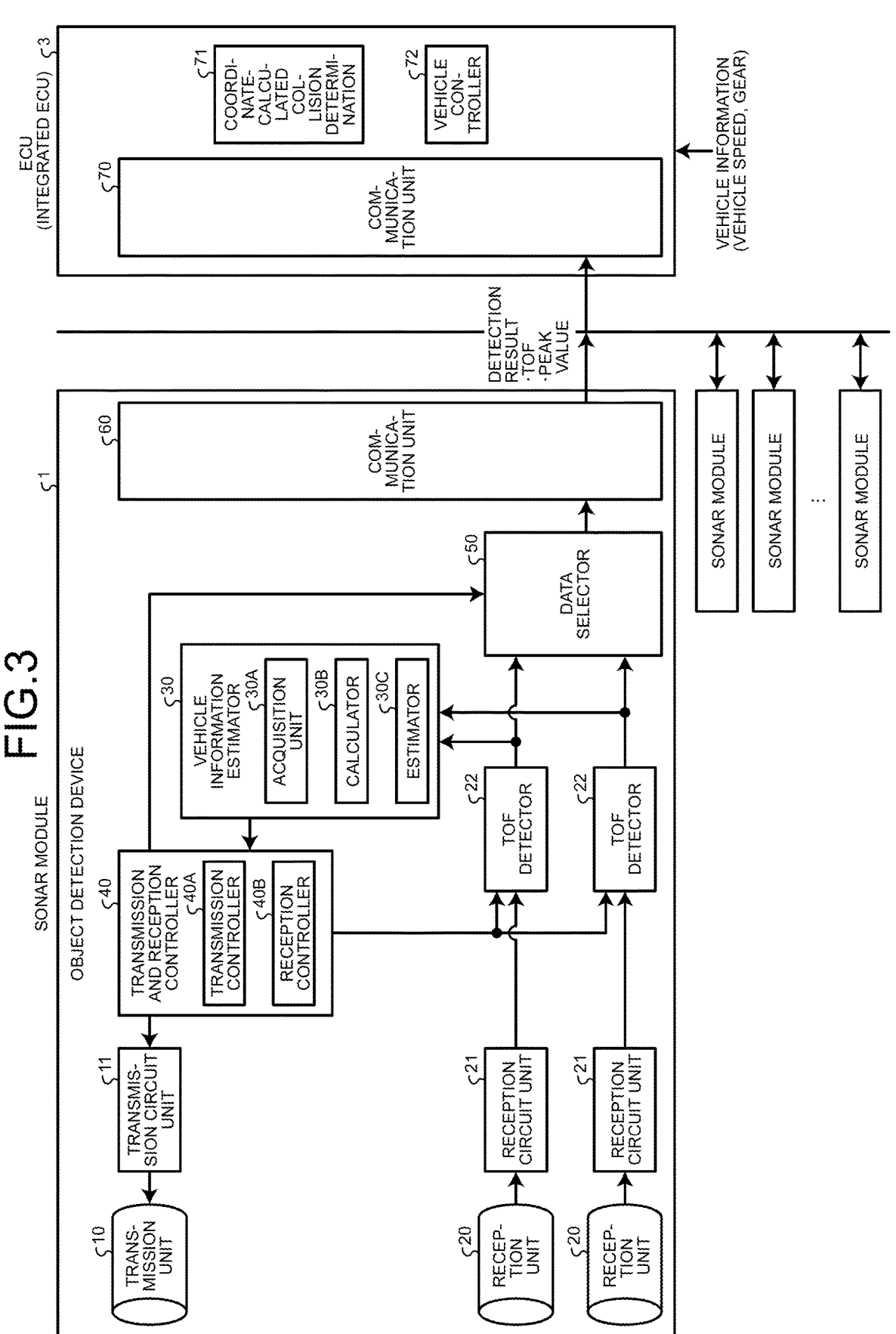
FIG. 3 is a diagram illustrating a configuration example of an object detection device according to an embodiment.

Next, a configuration example of an object detection device 1 will be described with reference to FIG. 3. As illustrated in FIG. 3, the object detection device 1 includes a transmission unit (transmission microphone) 10, reception units (reception microphones) 20, a vehicle information estimator 30, and a transmission and reception controller 40. The object detection device 1 may further include units used for object detection, such as a transmission circuit unit 11, reception circuit units 21, time of flight (TOF) detectors 22, a data selector 50, and a communication unit 60. The object detection device 1 is connected with an integrated ECU 3. A TOF and a peak value, which are detection results, are transmitted from the object detection device 1 to the integrated ECU 3 via the communication units 60 and 70. The coordinate-calculated collision determination unit 71 of the integrated ECU 3 calculates the coordinates of a detected obstacle using the detection results, determines the presence or absence of collision with the vehicle using the calculated coordinates and vehicle information, and outputs the determination result to a vehicle controller 72. The vehicle controller 72 controls the vehicle in accordance with the determination result. Hereinafter, each of the units included in the object detection device 1 will be described.

The transmission unit 10 transmits an ultrasonic wave. The transmission unit 10 is, for example, a transmission element that transmits an ultrasonic wave according with a voltage. For example, the transmission unit 10 transmits an ultrasonic wave according with a voltage from the transmission circuit unit 11.

The transmission circuit unit 11 applies a voltage for causing the transmission unit 10 to transmit an ultrasonic wave in accordance with a signal received from a transmission controller 40A.

A reception unit 20 receives the ultrasonic wave. The reception unit 20 is, for example, a reception element that generates a voltage according with the received ultrasonic wave. The reception unit 20 may be a micro electro mechanical systems (MEMS) microphone. The reception unit 20 receives the ultrasonic wave transmitted from the transmission unit 10. Moreover, for example, the reception unit 20 receives the ultrasonic wave transmitted from the transmission unit 10 and thereafter reflected by an obstacle.

A plurality of reception units 20 is provided in one sonar module. The number or the arrangement thereof can be modified as appropriate depending on the purpose. For example, the number of reception units 20 may be a multiple of 2. In addition, the reception units 20 may be arranged in a front-rear direction (a horizontal direction) of the vehicle while interposing the transmission unit 10, and be provided on a side face of the vehicle. Moreover, for example, the number of reception units 20 may be a multiple of 4, and the reception units 20 may be disposed to surround the transmission unit 10.

A reception circuit unit 21 converts a voltage generated in response to the ultrasonic wave received by a reception unit 20 into a signal.

A TOF detector 22 detects an elapsed time (time of flight: TOF) from when an ultrasonic wave is transmitted by the transmission unit 10 to when the ultrasonic wave is received by the reception unit 20. For example, the TOF detector 22 detects the time taken for receiving an ultrasonic wave by the reception unit 20 after the ultrasonic wave is transmitted by the transmission unit. Moreover, for example, the TOF detector 22 detects the time taken for receiving an ultrasonic wave by the reception unit 20 after the ultrasonic wave is transmitted by the transmission unit and reflected by an obstacle.

The vehicle information estimator 30 is an element for estimating vehicle information. The vehicle information estimator 30 includes an acquisition unit 30A, a calculator

30B, and an estimator 30C. Hereinafter, each of the units included in the vehicle information estimator 30 will be described.

The acquisition unit 30A acquires elapsed times from when an ultrasonic wave is transmitted from the transmission unit 10 to when the reception units 20 each receive the ultrasonic wave. For example, the acquisition unit 30A acquires the times (time of flight: TOF) detected by the TOF detectors 22 described above, as the times taken for receiving an ultrasonic wave by the reception units 20 after the ultrasonic wave is transmitted by the transmission unit 10.

The calculator 30B calculates the wind speed as a speed at which the air around the sonar module flows on the basis of the times acquired by the acquisition unit 30A, namely, the elapsed times from when an ultrasonic wave is transmitted from the transmission unit 10 to when the reception units 20 each receive the ultrasonic wave. The calculator 30B calculates the wind speed by using, for example, a time difference between the elapsed times acquired by the acquisition unit 30A.

The estimator 30C estimates the vehicle state on the basis of the wind speed calculated by the calculator 30B. For example, by using the wind speed calculated by the calculator 30B and a threshold value, the estimator 30C estimates the vehicle to be traveling forward. The vehicle state estimated by the estimator 30C includes, for example, a backward traveling of the vehicle or a vehicle speed, in addition to the forward traveling of the vehicle described above.

The transmission and reception controller 40 is an element for controlling transmission of an ultrasonic wave from the transmission unit 10 and reception of the ultrasonic wave by the reception units 20 and includes a transmission controller 40A and a reception controller 40B. Hereinafter, each of the units included in the transmission and reception controller 40 will be described.

The transmission controller 40A controls transmission of an ultrasonic wave from the transmission unit 10. The transmission controller 40A controls transmission of the ultrasonic wave from the transmission unit 10 in accordance with, for example, the vehicle state estimated by the estimator 30C. The transmission controller 40A controls the number of waves and the output level of the ultrasonic wave, etc. in accordance with the vehicle state estimated by the estimator 30C.

The reception controller 40B controls reception of the ultrasonic wave performed by the reception units 20 in accordance with the vehicle state estimated by the estimator 30C. For example, the reception controller 40B controls the frequency band of the ultrasonic wave received by the reception units 20 in accordance with the vehicle speed estimated by the estimator 30C.

The data selector 50 selects piece(s) of information to be transmitted to an external device, from among pieces of information transmitted from the above-described units included in the object detection device 1. For example, in a case where detection of an object (or obstacle) is performed, the data selector 50 selects, as a piece of information to be transmitted to the ECU 3, the elapsed time that is detected by one of the TOF detectors 22 and is taken for receiving an ultrasonic wave by the corresponding reception unit 20 after the ultrasonic wave is transmitted by the transmission unit 10 and reflected by the obstacle.

Moreover, for example, in a case where detection of the wind speed or estimation of the vehicle state is performed, the data selector 50 selects, as information to be transmitted to the ECU 3, the elapsed times that are detected by the TOF detectors 22 and are taken for receiving an ultrasonic wave by the reception units 20 after the ultrasonic wave is transmitted by the transmission unit 10 and reflected by the obstacle.

The communication unit 60 is implemented by a local interconnect network (LIN), a distributed systems interface (DSI), or the like, to enable communication with the ECU 3 at a relatively low speed and at a low cost.

3. Calculation of Wind Speed

Next, calculation of the wind speed as a speed at which the air around the sonar module flows by the object detection device 1 according to the embodiment will be described with reference to FIG. 4. Illustrated in FIG. 4 is a transmission and reception separated module (sonar module) in which a transmission unit 10 and reception units 20 are separated. In FIG. 4, the transmission unit 10 is disposed at a center of a sonar module 2, a reception unit 20a is disposed above the transmission unit 10, and a reception unit 20b is disposed below the transmission unit 10.

In the example illustrated in FIG. 4, it is assumed that the wind is blowing upwardly from the downward to the upward. In this case, the upper reception unit 20a receives an ultrasonic wave that is transmitted from the transmission unit 10 and directed in the same direction as the wind flow. Therefore, the time taken for receiving, by the upper reception unit 20a, the ultrasonic wave transmitted from the transmission unit 10 (TOF1: time of flight 1) is obtained by dividing the distance between the transmission unit 10 and the upper reception unit 20a by the sum of the speed of sound and the wind speed, as expressed by Equation (1) below.

$$TOF1 = \frac{\text{DISTANCE 1 BETWEEN TRANSMISSION UNIT AND RECEPTION UNIT}}{\text{SPEED OF SOUND} + \text{WIND SPEED}}$$

The lower reception unit 20b receives the ultrasonic wave that is transmitted from the transmission unit 10 and directed in a direction opposite to the wind flow. Therefore, the time taken for receiving, by the lower reception unit 20b, the ultrasonic wave transmitted from the transmission unit 10 (TOF2: time of flight 2) is obtained by dividing the distance between the transmission unit 10 and the lower reception unit 20b by a difference obtained by subtracting the wind speed from the speed of sound, as expressed in Equation (2) below.

$$TOF2 = \frac{\text{DISTANCE 2 BETWEEN TRANSMISSION UNIT AND RECEPTION UNIT}}{\text{SPEED OF SOUND} - \text{WIND SPEED}}$$

Therefore, the wind speed can be obtained by Equation (3) below. In this manner, the calculator 30B can calculate the wind speed by using a time difference between the elapsed times taken for receiving, by the reception units 20, the ultrasonic wave transmitted by the transmission unit 10.

$$\text{WIND SPEED} =$$

$$\left( \frac{\text{DISTANCE 1 BETWEEN TRANSMISSION UNIT AND RECEPTION UNIT}}{TOF1} - \right.$$

-continued $$\left. \frac{\text{DISTANCE 2 BETWEEN TRANSMISSION UNIT AND RECEPTION UNIT}}{TOF2} \right) \times \frac{1}{2}$$

Note that, in the example illustrated in FIG. 4, the reception unit 20a and the reception unit 20b are arranged in the up-down direction (a vertical direction) while interposing the transmission unit 10 between them. Alternatively, the reception units 20 according to the present embodiment may have a configuration illustrated in FIG. 5A. Specifically, two reception units 20 (reception units 20c and 20d) may be arranged in a left-right direction (the horizontal direction) while interposing the transmission unit 10 between them. Moreover, for example, the two reception units 20 may be arranged side by side on a side face of the vehicle in a front-rear direction of the vehicle while interposing the transmission unit 10 between them. By arranging the reception units 20 in this manner, the object detection device 1 can calculate highly accurately the wind speed of the wind flowing on the side face of the vehicle.

Moreover, the reception units 20 according to the present embodiment may have a configuration illustrated in FIG. 5B. Specifically, four reception units 20 (reception units 20a, 20b, 20c, and 20d) may be arranged above, below, on the left, and on the right of the transmission unit 10 so as to surround the transmission unit 10. By arranging the reception units 20 in this manner, the wind speed can be calculated with higher accuracy even when the airflow changes due to the shape of the vehicle surface.

4. Estimation of Vehicle State

Next, estimation of a vehicle state by the object detection device 1 according to the embodiment will be described with reference to FIGS. 6A and 6B. In the examples of FIGS. 6A to 6B, the estimator 30C of the object detection device 1 provided in the vehicle estimates the vehicle state on the basis of the wind speed. For example, the estimator 30C performs the estimation of the vehicle state by using a predetermined threshold value.

As illustrated in FIG. 6A, in a case where no natural wind is generated (no airflow), the upper reception unit 20a and the lower reception unit 20b simultaneously receive an ultrasonic wave transmitted from the transmission unit 10. For example, the wind speed is calculated to be 0 (m/s) by the calculator 30B, so that the estimator 30C estimates the vehicle to be in a stopped state on the basis of the wind speed being less than the predetermined threshold value.

Alternatively, as illustrated in FIG. 6B, in a case where the vehicle is traveling forward and the airflow is directed upward, the upper reception unit 20a receives an ultrasonic wave transmitted from the transmission unit 10 first, and, after that, the lower reception unit 20b receives the ultrasonic wave with a delay. The wind speed is calculated as X (m/s) by the calculator 30B, so that the estimator 30C estimates the vehicle the vehicle to be is traveling forward on the basis of the wind speed being higher than or equal to the predetermined threshold value.

5. Threshold Value Used for Estimation of Vehicle State

Figure 7A:
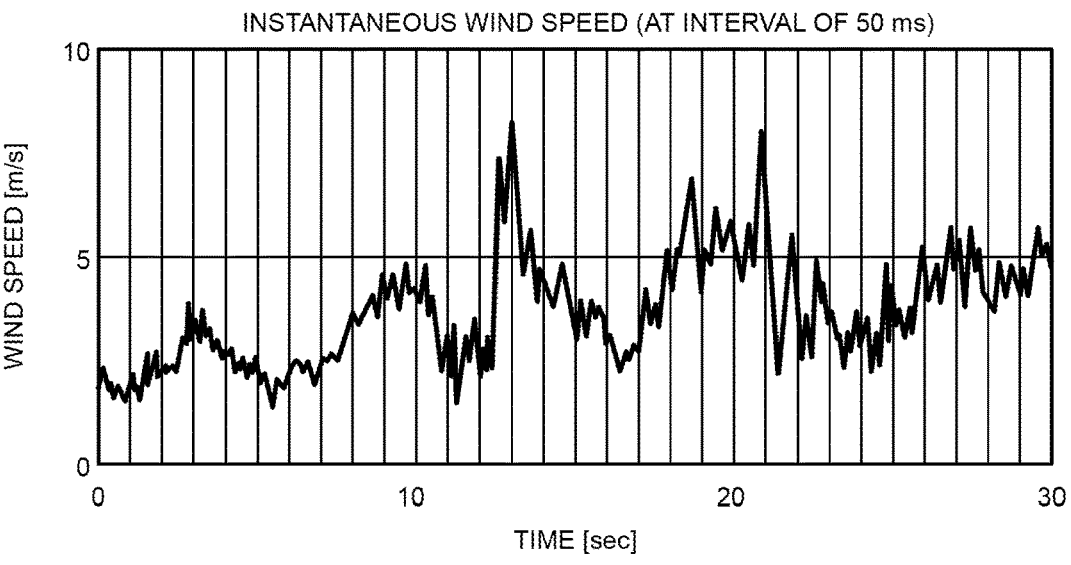
FIGS. 7A to 7C are diagrams for describing a threshold value used for estimation of a vehicle state.
Figure 7B:
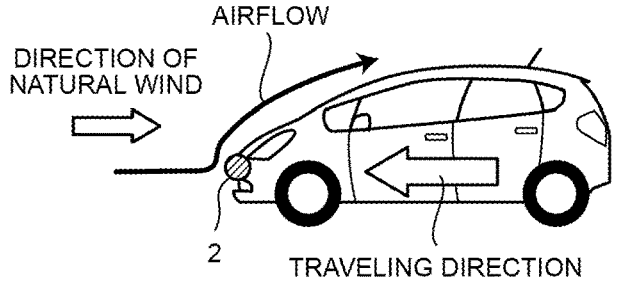
Figure 7C:
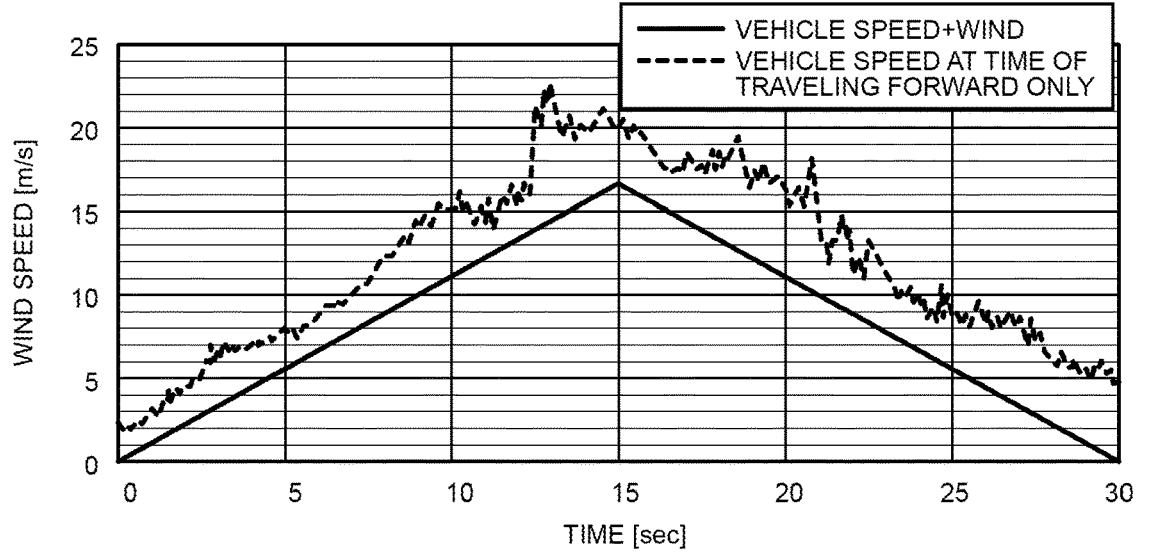

Next, the threshold value used for estimation of the vehicle state will be described with reference to FIGS. 7A to 7C. FIGS. 7A to 7C are diagrams for describing the threshold value used for estimation of the vehicle state. Illustrated in FIG. 7A represents the wind speed of the natural wind. Illustrated in FIG. 7B represents the relationship among the direction of the natural wind, the airflow around the vehicle, and the traveling direction of the vehicle. Illustrated in FIG. 7C represents a measurement result of the wind speed measured by a sonar module when the vehicle travels forward in a state where there is a natural wind. Note that, in this example, it is assumed that the natural wind has an average wind speed of 3.7 m/s and a maximum instantaneous wind speed of 8.2 m/s. The threshold value for determining forward traveling of the vehicle is assumed to be a wind speed of 10 m/s.

In the example illustrated in FIG. 7C, the vehicle constantly accelerates from 0 km/h to 60 km/h in fifteen seconds and then constantly decelerates to 0 km/h in fifteen seconds under the condition that the natural wind is a headwind blowing in a direction opposite to the traveling direction of the vehicle. In the example of FIG. 7C, the wind speed of 10 m/s is used as the threshold value, and when the vehicle speed is greater than or equal to 27.8 km/h (7.7 m/s), it is estimated that the wind speed exceeds the threshold value and that the vehicle is traveling forward.

In this manner, the estimator 30C detects whether or not the vehicle is traveling with high accuracy by using the wind speed of 10 m/s as the threshold value. In addition, the estimator 30C can prevent erroneous determination of estimating that the vehicle is traveling forward even though the vehicle is stopped except in a situation where the natural wind is extremely strong such as in bad weather.

Note that the estimator 30C can modify the threshold value as appropriate in accordance with the purpose whether giving priority to prevention of erroneous determination when the vehicle is stopped or promptly determining the forward traveling of the vehicle. As for a threshold value for estimating backward traveling of the vehicle, the threshold value of 10 m/s may be used similarly to the forward traveling of the vehicle, or a threshold value suitable for backward traveling of the vehicle may be used as appropriate.

6. Change of Transmission Pattern

Next, modification of a transmission pattern by the object detection device 1 according to the embodiment will be described with reference to FIGS. 8A to 8D. In an example of FIGS. 8A to 8D, a sonar module 2a is installed on a side face of a vehicle (see FIG. 8B), and two reception units 20 (reception units 20c and 20d) are arranged side by side in the front-rear direction of the vehicle on the side face of the vehicle while interposing a transmission unit 10 between them (see FIG. 8A).

Figures 8A, 8B, 8C, 8D:
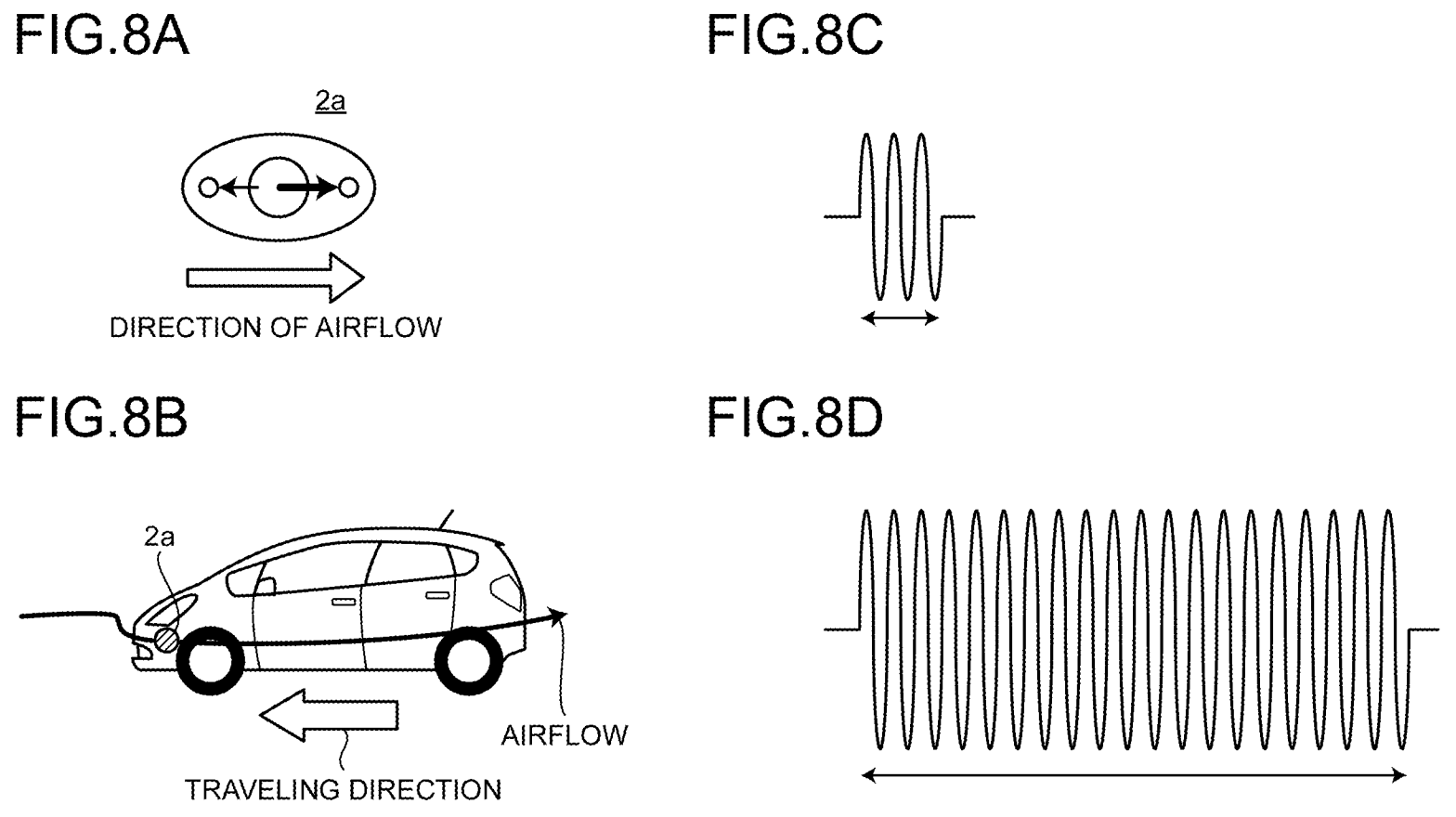

With the configuration above, the estimator 30C estimates the vehicle state on the basis of the wind speed of the airflow flowing on the side face of the vehicle, which is calculated by the calculator 30B (FIG. 8B). The transmission controller 40A controls transmission of the ultrasonic wave performed by the transmission unit 10 in accordance with the vehicle state estimated by the estimator 30C.

For example, in a case where the vehicle is estimated by the estimator 30C to be traveling forward at a low speed, the transmission controller 40A performs control, as illustrated in FIG. 8C, to reduce the wave number of ultrasonic waves transmitted from the transmission unit 10 and to also reduce the output level. Moreover, for example, in a case where the vehicle is estimated by the estimator 30C to be traveling forward at a speed higher than or equal to a predetermined speed, the transmission controller 40A performs control, as illustrated in FIG. 8D, to increase the wave number of ultrasonic waves transmitted from the transmission unit 10 and to also increase the output level.

In this manner, the transmission controller 40A controls the transmission of the ultrasonic wave by the transmission unit 10 in accordance with the vehicle state estimated by the estimator 30C, thereby making it possible to perform obstacle detection with high accuracy. For example, when the vehicle is traveling at a low speed, the transmission controller 40A reduces the wave number to make it easier to distinguish between the ultrasonic wave transmitted by the transmission unit 10 and a reflected wave from an obstacle. In addition, by reducing the output level, saturation of input of an analog digital converter (ADC) is prevented.

In addition, for example, by increasing the wave number and the output level when the vehicle is traveling forward at a speed higher than or equal to the predetermined speed, deterioration in detection accuracy due to attenuation of the ultrasonic wave is prevented when detecting an obstacle located far.

7. Modification of Object Detection Device

Figures 9A, 9B:
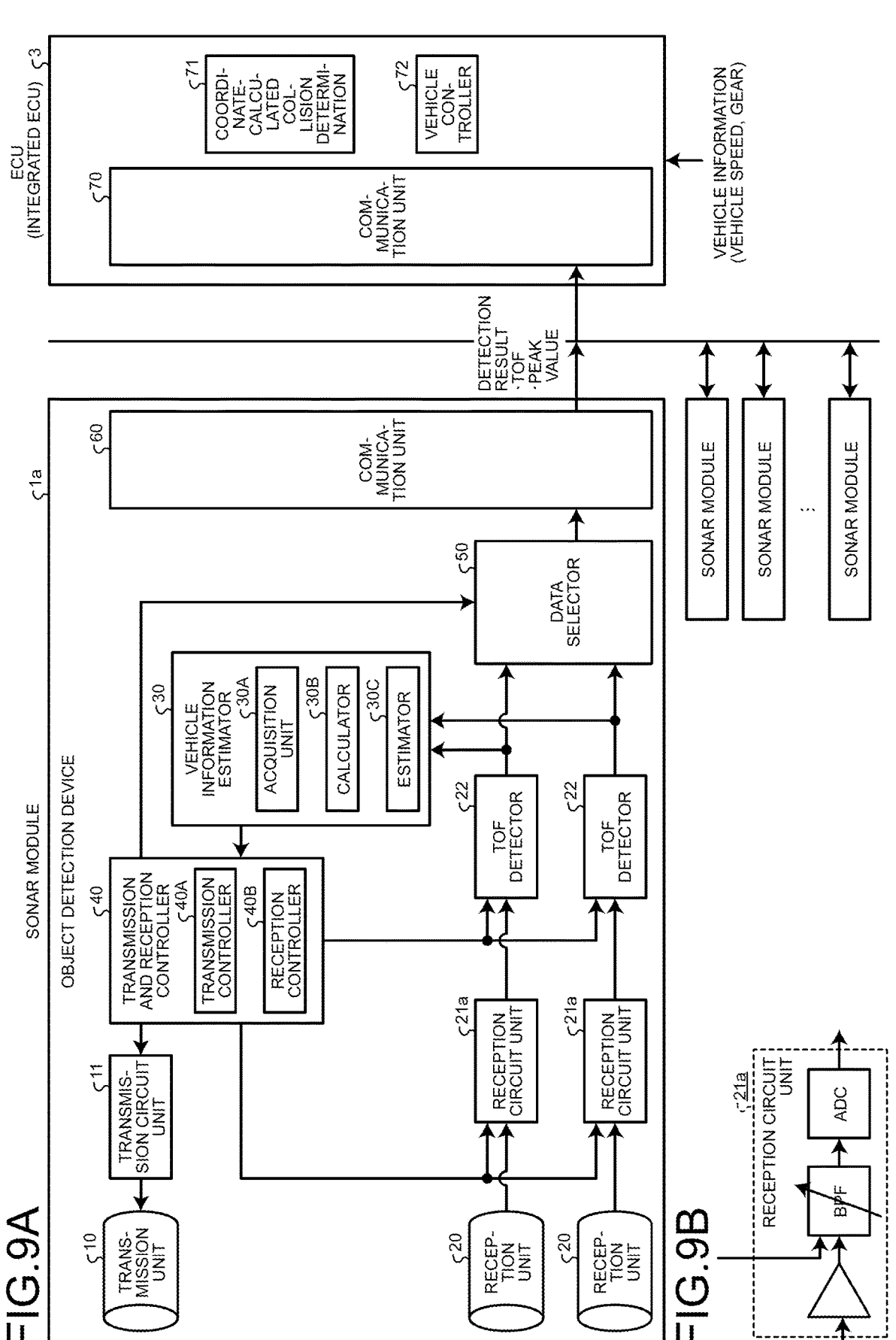
FIGS. 9A and 9B are diagrams illustrating a configuration example of an object detection device according to an embodiment.

Next, a modification of the object detection device 1 will be described with reference to FIGS. 9A and 9B. A difference between FIG. 9A and FIG. 3 is a point that control lines from a transmission and reception controller 40 to reception circuit units 21a are added. Moreover, in the present example, a reception circuit unit 21a includes an amplifier, a band pass filter (BPF), and an ADC as illustrated in FIG. 9B. Such a modification enables the object detection device 1 to change a reception band of an ultrasonic wave by reception units 20 in accordance with an estimated vehicle speed.

8. Change of Reception Band

Next, modification of the reception band by the object detection device 1 according to the embodiment will be described with reference to FIGS. 10A to 10C.

As illustrated in FIG. 10A, the frequency of an ultrasonic wave to be received by the reception units 20 after transmitted from a transmission unit 10 and reflected by an obstacle changes due to an influence of traveling of the vehicle on which the object detection device 1 is mounted (relative speed between the vehicle and the obstacle). For example, the frequency of the ultrasonic wave fluctuates with the vehicle speed as illustrated in FIG. 10B. However, it is based on the premise that the obstacle is substantially in a stopped state.

In a case where the transmission unit 10 transmits an ultrasonic wave of 60 kHz when the vehicle speed is 0 km/h, the ultrasonic wave is received with 60 kHz by the reception units 20. Meanwhile, when the vehicle speed is 70 km/h, the reception units 20 receive an ultrasonic wave of 63.6 kHz.

The reception controller 40B changes the reception band of the ultrasonic wave for the reception units 20 in accordance with an estimated speed of the vehicle. For example, as illustrated in FIG. 10C, the reception controller 40B changes the reception band of the ultrasonic wave by narrowing (or reducing) the pass band of the BPFs of the reception circuit units 21a.

As described above, the reception controller 40B controls reception of the ultrasonic wave by the reception units 20 in accordance with an estimated vehicle speed, thereby reducing the influence of noise or interfering waves and enhancing the detection performance.

9. Flowchart

Figure 11:
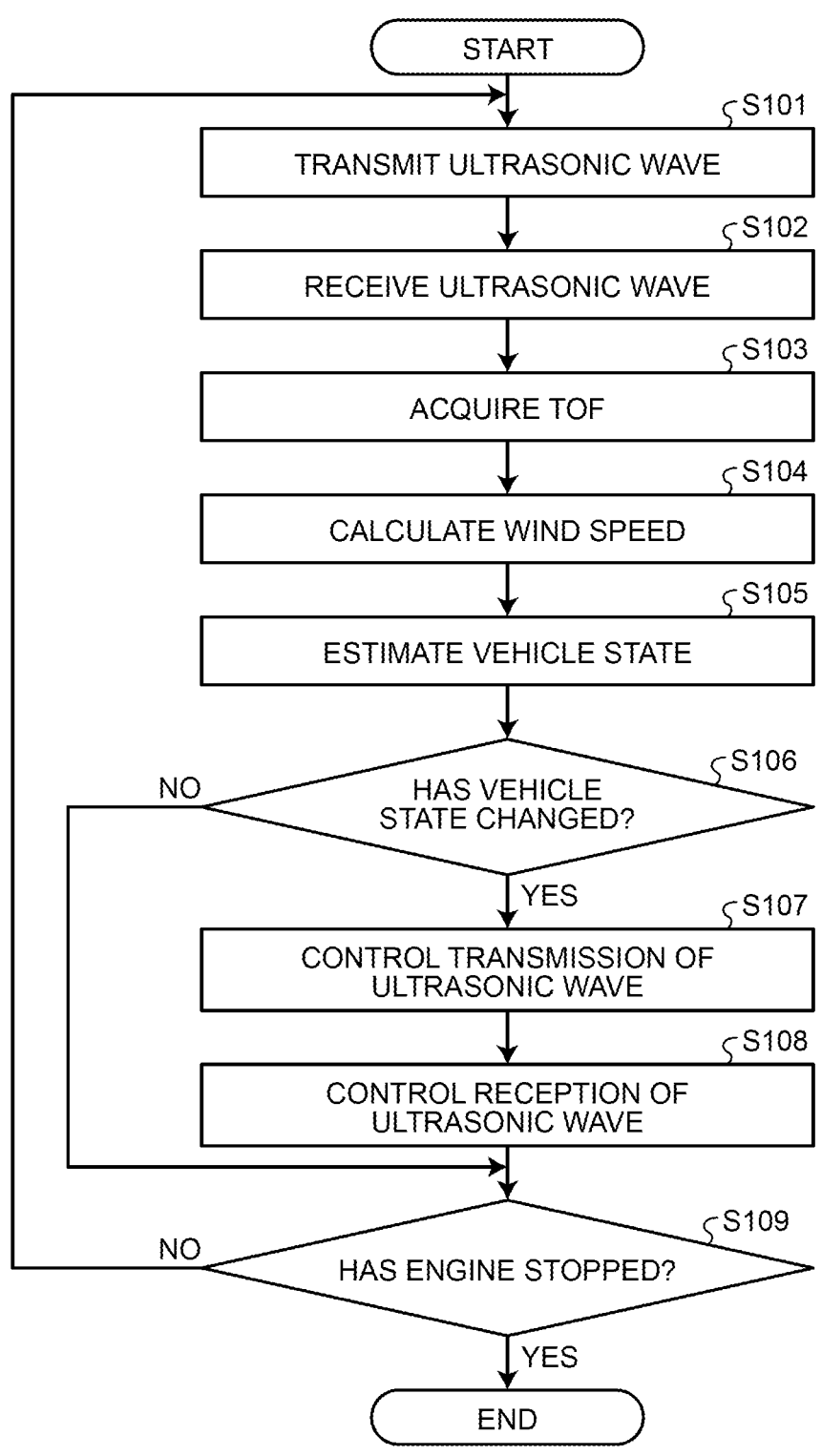
FIG. 11 is a flowchart illustrating an example of a procedure of determination processing according to the embodiment.

Next, a procedure of processing executed by the object detection device 1 according to the embodiment will be described with reference to FIG. 11. The following steps can be executed in another order, and part of the steps may be omitted.

First, the transmission unit 10 transmits an ultrasonic wave (step S101). For example, the transmission unit 10 transmits an ultrasonic wave according with a voltage from the transmission circuit unit 11.

The reception units 20 receive the ultrasonic wave (step S102). For example, the reception units 20 receive the ultrasonic wave transmitted from the transmission unit 10.

The acquisition unit 30A acquires elapsed times from when the ultrasonic wave is transmitted from the transmission unit 10 to when the reception units 20 each receive the ultrasonic wave (step S103). For example, the acquisition unit 30A acquires the times (TOF: time of flight) detected by the TOF detectors 22.

Subsequently, the calculator 30B calculates the wind speed by using the times acquired by the acquisition unit 30A (step S104). The calculator 30B calculates the wind speed by using, for example, a time difference between the times acquired by the acquisition unit 30A.

The estimator 30C estimates the vehicle state on the basis of the wind speed calculated by the calculator 30B (step S105). For example, the estimator 30C estimates the vehicle to be traveling forward, by using the wind speed calculated by the calculator 30B and a threshold value.

Subsequently, the transmission and reception controller 40 determines whether the vehicle state has changed (step S106). In response to determining, by the transmission and reception controller 40, that the vehicle state has changed ("YES" in step S106), the transmission controller 40A controls transmission of the ultrasonic wave from the transmission unit 10 (step S107). The transmission controller 40A controls transmission of the ultrasonic wave from the transmission unit 10 in accordance with the vehicle state estimated by the estimator 30C. For example, the transmission controller 40A controls the wave number and/or the output level of the ultrasonic wave to be transmitted by the transmission unit 10 in accordance with the vehicle state estimated by the estimator 30C.

The reception controller 40B controls reception of the ultrasonic wave by the reception units 20 in accordance with the vehicle state estimated by the estimator 30C (step S108). For example, the reception controller 40B controls the frequency band of the ultrasonic wave received by the reception units 20 in accordance with the vehicle speed estimated by the estimator 30C.

On the other hand, in response to determining, by the transmission and reception controller 40, that the vehicle state has not changed ("NO" in step S106), the above-described transmission control by the transmission controller 40A (step S107) and the above-described reception control by the reception controller 40B (step S108) are not performed.

The object detection device 1 determines whether or not the engine is stopped (step S109). When the engine is stopped ("YES" in step S109), the processing by the object detection device 1 is ended.

On the other hand, when the engine is not stopped ("NO" in step S109), the processing is performed from step S101 again.

10. Effects

As described above, the object detection device 1 according to the embodiment includes the acquisition unit 30A, the calculator 30B, and the estimator 30C. The acquisition unit 30A acquires elapsed times from when the transmission unit 10 transmits an ultrasonic wave to when the reception units 20 each receive the ultrasonic wave. The calculator 30B calculates the wind speed on the basis of the times acquired by the acquisition unit 30A. The estimator 30C estimates the vehicle state on the basis of the wind speed calculated by the calculator 30B.

With the configuration above, the object detection device 1 according to the embodiment calculates the wind speed by using the times taken for receiving the ultrasonic wave and estimates the vehicle state on the basis of the wind speed. Therefore, it is possible to acquire the vehicle state while autonomously operating, and to reduce the communication capacity between the sensors and the ECU. Therefore, an increase in the number of sensors can be handled.

In addition, the number of reception units 20 in the object detection device 1 according to the embodiment is a multiple of 2. With this configuration, the object detection device 1 according to the embodiment calculates the wind speed by using the elapsed times taken for receiving the ultrasonic wave and estimates the vehicle state on the basis of the wind speed. Therefore, it is possible to acquire the vehicle state while autonomously operating and to reduce the communication capacity between the sensors and the ECU, thereby making it possible to handle an increase in the number of sensors.

In addition, the reception units 20 of the object detection device 1 according to the embodiment are provided on a side face of the vehicle side by side in the front-rear direction of the vehicle while interposing the transmission unit 10 between them. With this configuration, the object detection device 1 according to the embodiment calculates the wind speed of the wind flowing on the side face of the vehicle by using the elapsed times taken for receiving the ultrasonic wave and estimates the vehicle state on the basis of the wind speed. Therefore, it is possible to acquire the vehicle state while autonomously operating and to reduce the communication capacity between the sensors and the ECU, thereby making it possible to handle an increase in the number of sensors.

In addition, the number of reception units 20 of the object detection device 1 according to the embodiment is a multiple of 4, and the reception units 20 are arranged so as to surround the transmission unit 10. With this configuration, the object detection device 1 according to the embodiment calculates the wind speed of the wind flowing on the surface of the vehicle by using the elapsed times taken for receiving the ultrasonic wave and estimates the vehicle state on the basis of the wind speed. Therefore, it is possible to acquire the vehicle state while autonomously operating and to reduce the communication capacity between the sensors and the ECU, thereby making it possible to handle an increase in the number of sensors.

In addition, the calculator 30B of the object detection device 1 according to the embodiment calculates the wind speed by using a time difference between the times acquired by the acquisition unit 30A, as the times from when the transmission unit 10 transmits an ultrasonic wave to when the reception units 20 each receive the ultrasonic wave.

With the configuration above, the object detection device 1 according to the embodiment calculates the wind speed by using a time difference between the times taken for receiving the ultrasonic wave and estimates the vehicle state on the basis of the wind speed. Therefore, it is possible to acquire the vehicle state while autonomously operating and reducing the communication capacity between the sensors and the ECU, thereby making it possible to handle an increase in the number of sensors.

Moreover, the object detection device 1 according to the embodiment further includes the transmission controller 40A that controls transmission of the ultrasonic wave performed by the transmission unit 10, in accordance with the vehicle state estimated by the estimator 30C.

With the configuration above, the object detection device 1 according to the embodiment controls transmission of the ultrasonic wave in accordance with the vehicle state that has been estimated, thereby enhancing the detection accuracy of an obstacle, acquiring the vehicle state while autonomously operating, and reducing the communication capacity between the sensors and the ECU, thereby making it possible to handle an increase in the number of sensors.

Moreover, the object detection device 1 according to the embodiment further includes the reception controller 40B that controls reception of the ultrasonic wave performed by the reception units 20, in accordance with the vehicle state estimated by the estimator 30C.

With the configuration above, the object detection device 1 according to the embodiment controls reception of the ultrasonic wave in accordance with the vehicle state that has been estimated, thereby enhancing the detection accuracy of an obstacle, acquiring the vehicle state while autonomously operating, and reducing the communication capacity between the sensors and the ECU, thereby making it possible to handle an increase in the number of sensors.

11. Hardware Configuration

Figure 12:
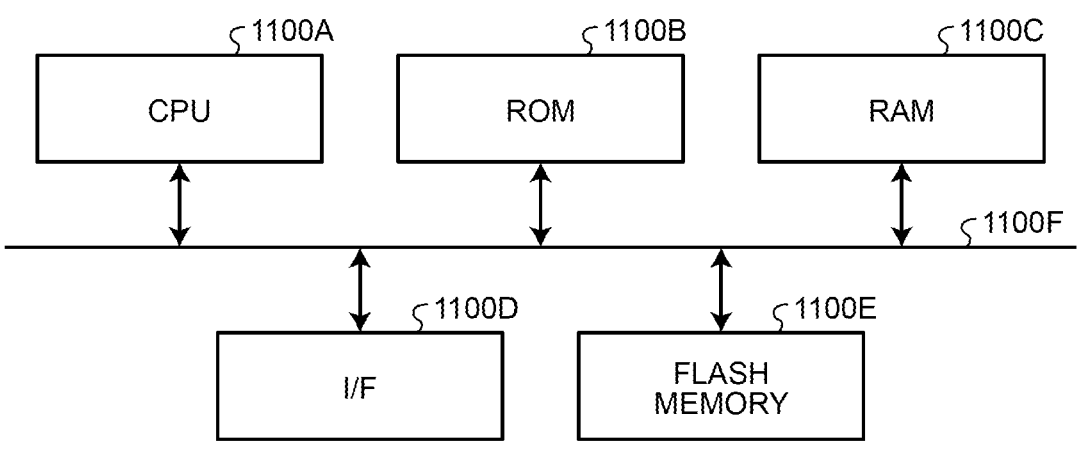
FIG. 12 is a diagram illustrating an example of a hardware configuration of a control device according to the embodiment.

Next, hardware configurations of the vehicle information estimator 30, the transmission and reception controller 40, the transmission circuit unit 11, the reception circuit units 21, the TOF detectors 22, and the data selector 50 in the object detection device 1 will be described with reference to FIG. 12. As illustrated in FIG. 12, in the object detection device 1, a central processing unit (CPU) 1100A, a read only memory (ROM) 1100B, a random access memory (RAM) 1100C, an interface (I/F) 1100D, a flash memory 1100E, and others are mutually connected by a bus 1100F, which is a hardware configuration using a normal computer.

The CPU 1100A is an arithmetic device that controls the entire object detection device 1. The CPU 1100A is an example of a processor. Another processor or a processing circuit may be provided in place of the CPU 1100A. The ROM 1100B stores computer programs and the like for implementing various types of processing by the CPU 1100A. The RAM 1100C is, for example, a main storage device of the object detection device 1 and stores data used for various types of processing by the CPU 1100A. The I/F 1100D is a communication interface for transmitting and receiving data. The flash memory 1100E is an example of a writable nonvolatile storage medium. The ROM 1100B, the RAM 1100C, and the flash memory 1100E are also referred to as storage units. Note that the object detection device 1 may include another storage device such as a hard disk drive (HDD) instead of the flash memory 1100E or in addition to the flash memory 1100E.

12. Others

The detection systems and others according to one or more aspects of the present disclosure have been described above on the basis of the embodiments, whereas the present disclosure is not limited to those embodiments. The present disclosure may also include embodiments obtained by applying various modifications conceived by those skilled in the art to the present embodiments and embodiments configured by combining components in different embodiments without departing from the gist of the present disclosure.

The order of the steps in the flowchart is an example for the purpose of specifically describing the present disclosure, and an order other than the above-described one may be employed. In addition, some of the steps may be executed simultaneously (in parallel) with other steps, and some of the steps may not be executed.

Moreover, division of the functional blocks in the block diagrams are an example. Some of the functional blocks may be implemented as a single functional block, a single functional block may be divided into two or more functional blocks, or some functions may be transferred to another functional block. In addition, functions of functional blocks having similar functions may be processed in parallel or in a time division manner by a single piece of hardware or software.

In the above-described embodiments, a notation of " . . . unit ( . . . er/ . . . or)" used for each component may be replaced with another notation such as " . . . circuitry (or circuit)", " . . . assembly", " . . . device", or " . . . module".

What is claimed is:

1. An object detection device configured to be mounted on a vehicle, the object detection device comprising:
   an acquisition circuit which, in operation, acquires elapsed times from when an ultrasonic wave is transmitted from a transmission microphone to when reception microphones each receive the ultrasonic wave;
   a calculation circuit which, in operation, calculates a wind speed based on the elapsed times acquired by the acquisition circuit; and
   an estimation circuit which, in operation, estimates a traveling direction of the vehicle based on the wind speed calculated by the calculation circuit.

2. The object detection device according to claim 1, wherein a number of the reception microphones is a multiple of 2.

3. The object detection device according to claim 1, wherein the reception microphones are provided on a side face of a vehicle, the reception microphones being arranged in a horizontal direction of the vehicle while interposing the transmission microphone between the reception microphones.

4. The object detection device according to claim 1, wherein the reception microphones are provided on a front face of a vehicle, the reception microphones being arranged in a vertical direction of the vehicle while interposing the transmission microphone between the reception microphones.

5. The object detection device according to claim 1, wherein
   a number of the reception microphones is a multiple of 4, and
   the reception microphones are disposed to surround the transmission microphone.

6. The object detection device according to claim 1, wherein the calculation circuit which, in operation, performs calculation of the wind speed by using a time difference between the elapsed times acquired by the acquisition circuit.

7. The object detection device according to claim 1, further comprising a transmission control circuit which, in operation, controls transmission of ultrasonic wave performed by the transmission microphone in accordance with the traveling direction of the vehicle estimated by the estimation circuit.

8. The object detection device according to claim 1, further comprising a reception control circuit which, in operation, controls reception of ultrasonic wave performed by the reception microphones in accordance with the traveling direction of the vehicle estimated by the estimation circuit.

9. An object detection method by an object detection device configured to be mounted on a vehicle, the method comprising:

acquiring elapsed times from when an ultrasonic wave is transmitted from a transmission microphone to when reception microphones each receive the ultrasonic wave;

calculating a wind speed based on the elapsed times acquired by the acquiring; and estimating a traveling direction of the vehicle based on the wind speed calculated by the calculating.

10. The object detection method according to claim 9, wherein a number of the reception microphones is a multiple of 2.

11. The object detection method according to claim 9, wherein the reception microphones are provided on a side face of a vehicle, the reception microphones being arranged in a horizontal direction of the vehicle while interposing the transmission microphone between the reception microphones.

12. The object detection method according to claim 9, wherein the reception microphones are provided on a front face of a vehicle, the reception microphones being arranged in a vertical direction of the vehicle while interposing the transmission microphone between the reception microphones.

13. The object detection method according to claim 9, wherein a number of the reception microphones is a multiple of 4, and the reception microphones are disposed to surround the transmission microphone.

14. The object detection method according to claim 9, wherein the calculating of the wind speed is performed by using a time difference between the elapsed times acquired by the acquiring.

15. The object detection method according to claim 9, further comprising controlling transmission of ultrasonic wave performed by the transmission microphone in accordance with the traveling direction of the vehicle estimated by the estimating.

16. The object detection method according to claim 9, further comprising controlling reception of ultrasonic wave performed by the reception microphones in accordance with the traveling direction of the vehicle estimated by the estimating.

17. A non-transitory computer-readable recording medium on which programmed instructions are recorded, the programmed instructions causing a computer configured to be mounted on a vehicle to execute processing, the processing comprising:

acquiring elapsed times from when an ultrasonic wave is transmitted from a transmission microphone to when reception microphones each receive the ultrasonic wave;

calculating a wind speed based on the elapsed times acquired by the acquiring; and estimating a traveling direction of the vehicle based on the wind speed calculated by the calculating.

18. The object detection device according to claim 7, wherein:

the estimation circuit, in operation, further estimates a speed of the vehicle based on the wind speed calculated by the calculation circuit;

in a case that the traveling direction of the vehicle estimated by the estimation circuit is forward and the speed of the vehicle estimated by the estimation circuit is lower than a predetermined value, a transmission control circuit, in operation, reduces a wave number of the ultrasonic wave transmitted from the transmission microphone and reduces an output level of the ultrasonic wave; and in a case that the traveling direction of the vehicle estimated by the estimation circuit is forward and the speed of the vehicle estimated by the estimation circuit is not less than the predetermined value, the transmission control circuit, in operation, increases the wave number of the ultrasonic wave transmitted from the transmission microphone and increases the output level of the ultrasonic wave.

19. The object detection method according to claim 9, further comprising:

estimating a speed of the vehicle based on the wind speed calculated by the calculating;

reducing a wave number of the ultrasonic wave transmitted from the transmission microphone and an output level of the ultrasonic wave, in a case that the traveling direction of the vehicle by the estimating is forward and the speed of the vehicle by the estimating is lower than a predetermined value; and increasing the wave number of the ultrasonic wave transmitted from the transmission microphone and the output level of the ultrasonic wave, in a case that the traveling direction of the vehicle by the estimating is forward and the speed of the vehicle by the estimating is not less than the predetermined value.

* * * * *